(12) United States Patent
Grcevski et al.

(10) Patent No.: US 8,286,152 B2
(45) Date of Patent: Oct. 9, 2012

(54) SYSTEMS, METHODS, AND COMPUTER PRODUCTS FOR JUST-IN-TIME COMPILATION FOR VIRTUAL MACHINE ENVIRONMENTS FOR FAST APPLICATION STARTUP AND MAXIMAL RUN-TIME PERFORMANCE

(75) Inventors: Nikola Grcevski, Toronto (CA); Derek B. Inglis, Markham (CA); Marius Pirvu, Toronto (CA); Mark G. Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 11/842,986

(22) Filed: Aug. 22, 2007

(65) Prior Publication Data
US 2009/0055821 A1    Feb. 26, 2009

(51) Int. Cl.
*G06F 9/45* (2006.01)
(52) U.S. Cl. ......... 717/148; 717/140; 717/145; 717/151
(58) Field of Classification Search ........................ None
See application file for complete search history.

(56) References Cited

U.S. PATENT DOCUMENTS

| | | | |
|---|---|---|---|
| 6,591,414 B2* | 7/2003 | Hibi et al. | 717/151 |
| 6,952,821 B2* | 10/2005 | Schreiber | 717/151 |
| 7,174,544 B2* | 2/2007 | Zee | 717/148 |
| 2004/0083467 A1* | 4/2004 | Hanley et al. | 717/148 |
| 2006/0070051 A1* | 3/2006 | Kuck et al. | 717/162 |
| 2006/0190932 A1* | 8/2006 | Gilbert | 717/140 |
| 2007/0061793 A1 | 3/2007 | Inglis et al. | |
| 2007/0261038 A1* | 11/2007 | Suba et al. | 717/136 |
| 2008/0134156 A1* | 6/2008 | Osminer et al. | 717/140 |
| 2008/0301652 A1* | 12/2008 | Song et al. | 717/148 |
| 2008/0301653 A1* | 12/2008 | Song et al. | 717/148 |
| 2009/0271772 A1* | 10/2009 | Stephenson et al. | 717/145 |

OTHER PUBLICATIONS

Sundaresan et al., Experiences with Multi-threading and Dynamic Class Loading in a Java Just-In-Time Compiler, Mar. 2006, 11 pages, <http://delivery.acm.org/10.1145/1130000/1122395/24990087.pdf>.*
Tikir et al., Recompilation for debugging support in a JIT-compiler, Jan. 2003, 8 pages, <http://delivery.acm.org/10.1145/590000/586100/p10-tikir.pdf>.*
Java technology, IBM style: Class sharing, [online]; [retrieved on Aug. 15, 2007]; retrieved from the Internet http://www.ibm.com/developerworks/java/library/j-ibmjava4/.

(Continued)

*Primary Examiner* — Thuy Dao
(74) *Attorney, Agent, or Firm* — Cantor Colburn LLP; Libby Toub

(57) ABSTRACT

Systems, methods, and computer products for just-in-time compilation for virtual machine environments for fast applications start-up and maximal run-time performance. Exemplary embodiments include a just in time compilation method for a virtual machine environment coupled to a memory, including identifying a program structure for compilation, creating a low optimization compiled version of the program structure that is relocatable in the memory, storing into a persistent cache the low optimization compiled version of the program structure that is relocatable and relocating the low optimization compiled version of the program structure into a virtual machine address space in the memory, wherein relocating the low optimization compiled version of the program structure includes transforming the low optimization compiled version to a compiled version with fixed addresses in the memory that can be executed.

3 Claims, 5 Drawing Sheets

OTHER PUBLICATIONS

Core Java J2SA 5.0, [online]; [retrieved on Aug. 15, 2007]; retrieved from the Internet http://java.sun.com/j2se/1.5.0/.

IBM Developer Kit and Runtime Environment, Java Technology Edition, Version 5.0 Diagnostics Guide, Jun. 2007.

Arnold et al., P.F. 2000. "Adaptive Optimization in the Jalapeno JVM"; ACM SIGPLAN Conference on Object-Oriented Programming, Systems, Languages, and Applications (OOPSLA '00), Minneapolis, Minnesota, Oct. 15-19, 2000.

Burke et al., "The Jalapeno Dynamic Optimizing Compiler for Java"; ACM 1999 Java Grande Conference.

Burger et al., "An Infrastructure for Profile=Driven Dynamic Recompilation"; ICCL '98.

* cited by examiner

SYSTEMS, METHODS, AND COMPUTER PRODUCTS FOR JUST-IN-TIME COMPILATION FOR VIRTUAL MACHINE ENVIRONMENTS FOR FAST APPLICATION STARTUP AND MAXIMAL RUN-TIME PERFORMANCE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to compilers, and particularly to systems, methods, and computer products for just-in-time compilation for virtual machine environments for fast applications start-up and maximal run-time performance.

2. Description of Background

Modern virtual machine (VM) environments often employ interpreter and just-in-time (JIT) compiler components, with different policies when the compiler is used versus the interpreter. The interpreter component is typically efficient at running infrequently executed code, because it doesn't introduce initial overhead of transforming the VM intermediate code. However, if the interpreted VM code is executed frequently, it is more efficient to compile the code and run the binary form of the intermediate code. The VM execution environment employs strategies in order to balance the time spent compiling, versus the potential benefit of running faster compiled native code. If the compiler takes more time to optimize the code, the generated code is improved. However, if the compiler takes a long time to optimize the code, it impedes the startup time of the application, because the compilation is occurring at application run-time.

Application startup-time performance is critical in two distinct circumstances: client application software and server middleware application software. With client applications, it is desirable to bring up the application as soon as possible and avoid long pause times to improve user experience. However, the startup performance of application middleware software is important to minimize potential "down-time" of the server, when the application server is restarted. The run-time expectations of client application software and server middleware application software are different. The client application performance does not suffer if the code that it is running isn't optimized at a very high optimization level, since much of the client application components are user interface elements. Furthermore, as long as the user interface performance is "acceptable", it is not noticeable that the code is faster or slower. However, the throughput performance of the application middleware software is critical, where every percent of performance translates into additional transactions performed per second, that is, more customers are served with the same hardware/software configuration.

Some modern VM environments employ staged compilation to mitigate the problem of balancing the compilation time overhead versus the run-time performance of better optimized code. The JIT compiler initially compiles the code at lower optimization level and then selectively recompiles various "hot" methods. "Hot" means that the method code is executed very frequently or that it takes some significant amount of time from the program execution. Various techniques can be applied to identify the "hot" portions of the code. However, current approaches do not work if the executing program doesn't have distinct "hot" portions of code. Such programs, where every piece of the code is equally important, are said to have a flat execution profile. Typical examples of applications with flat execution profiles are: user interface applications and application middleware software which is by default large, in order to handle various kinds of application structures.

There exists a need for systems and methods to address the performance problems related to code transformation from one representation to another in the context of applications with flat execution profiles.

SUMMARY OF THE INVENTION

Exemplary embodiments include a just in time compilation method for a virtual machine environment coupled to a memory, including identifying a program structure for compilation, creating a low optimization compiled version of the program structure that is relocatable in the memory, storing into a persistent cache the low optimization compiled version of the program structure that is relocatable and relocating the low optimization compiled version of the program structure into a virtual machine address space in the memory, wherein relocating the low optimization compiled version of the program structure includes transforming the low optimization compiled version to a compiled version with fixed addresses in the memory that can be executed.

Further exemplary embodiments include a just in time compilation system, including a virtual machine environment having a central processing unit and a memory coupled to the central processing unit, a just in time compilation process residing in the memory and having instructions for identifying a program structure for compilation, creating a low optimization compiled version of the program structure that is relocatable in the memory, storing into a persistent cache the low optimization compiled version of the program structure that is relocatable, relocating the low optimization compiled version of the program structure into a virtual machine address space in the memory, wherein relocating the low optimization compiled version of the program structure includes transforming the low optimization compiled version to a compiled version with fixed addresses in the memory that can be executed, responsive to a determination that a relocatable code version of the program structure already exists in the persistent cache, loading the relocatable code version of the program structure from the persistent shared cache, relocating the loaded relocatable code version of the program structure into a current address space wherein, relocating the loaded relocatable code version of the program structure includes transforming the low optimization compiled version of the program structure to a compiled version of the program structure with fixed addresses in the memory that can be executed, assigning a priority to the program structure, wherein a higher initial compilation optimization level is assigned a lower priority and a lower initial compilation optimization level is assigned a higher priority, placing the an entry associated with the prioritized program structure in a queue, retrieving the prioritized program structure from the queue in response to a compilation thread processing the assigned priority and adjusting a compilation rate based on utilization for a central processing unit coupled to the virtual machine environment.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution has been achieved in which implementing JIT compilation, an initial compilation is performed with a low optimization level and stored in a persistent cache for later use. Automatic persistence of compiled code in a dynamic compilation system is performed on a first application run and persistent compiled code is reused at a later point. The initial optimization level is upgraded to a highest level over time for server based applications. Furthermore, compilation overhead is minimized for client-type applications.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
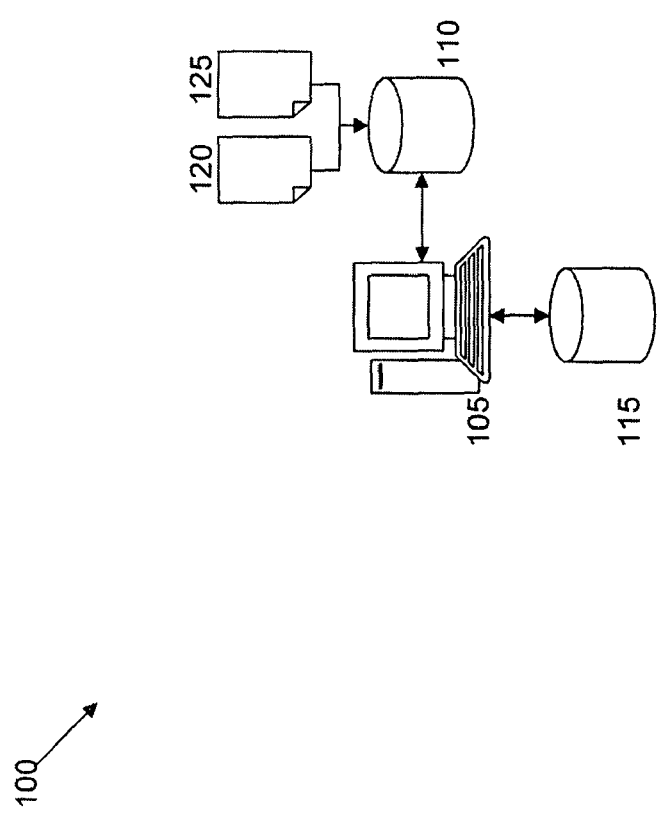
FIG. 1 illustrates an exemplary system for just-in-time compilation for virtual machine environments for fast applications start-up and maximal run-time performance.

The detailed description explains the preferred embodiments of the invention, together with advantages and features, by way of example with reference to the drawings.

DETAILED DESCRIPTION OF THE INVENTION

Exemplary embodiments include systems and methods that implement a well known approach to persist VM data structures in memory (or any other form of persistent storage, like hard-disk), which can be used on multiple VM executions. In exemplary embodiments, the systems and methods described herein implement a "persistence", (e.g., a memory, a disk, and other forms as described herein), which can be referred to as a persistent cache. This persistent cache guarantees that the persistent code is associated with a very particular class which 1) must not have changed since the code was stored, 2) must be the same class loaded by both the "first" JVM and "subsequent" JVMs, i.e. that this class is the one that will be found first on the class paths used to execute both JVMs.

In exemplary embodiments, the first time a program structure (which may be a method or may be any subset of a program's code) is identified for native code compilation, a very low optimization compiled version of the program structure is created in such a way that the compiled version of the code is "relocatable". "Relocatable" means that the code doesn't contain any fixed memory addresses and isn't directly executable, but instead, it is easily transformable to a version with fixed addresses that can be executed. Associated with each fixed address is additional information about what the address needs to point to so that each fixed address can be transformed regardless of where in memory it is loaded. After the "relocatable" version of the code is generated and stored into the persistent cache, the code is relocated into the current VM's address space and can subsequently be executed by the program running in the current JVM. Any other VM instance that is subsequently started can search the persistent cache for a relocatable version of the program structure. Once found, this relocatable version can be loaded from the persistent cache and then relocated into that VM to avoid the time needed to compile the program structure. Thus, the initial compiled code executed for a program structure in a VM is a relocatable code version either compiled directly by the current VM or loaded from a persistent cache. After the initial compilation and relocation is completed the next client type of workload and the server type of workload are differentiated. In exemplary embodiments, the initial optimization level is upgraded to a highest level over time for server based applications. Furthermore, compilation overhead is minimized for client-type applications.

In exemplary embodiments, a first start of an application instance is different from the second one in a way that relocatable code doesn't exist and has to be created. If the system described herein is running in server mode, the code is optimized with a higher optimization on the first instance. In further exemplary embodiments, the second, third and all subsequent application instances take advantage of the existence of the relocatable code, but the first application instance need not terminate for these events to occur, as further described herein.

FIG. 1 illustrates an exemplary system 100 for just-in-time compilation for virtual machine environments for fast applications start-up and maximal run-time performance. In exemplary embodiments, the system 100 includes a processing device 105 such as a computer, which includes a storage medium or memory 110. The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processing device 105.

A data repository 115 is coupled to and in communication with the processing device 105. The system 100 can further include a JIT compiler 120. The compiler 120 can be any computer program (or set of programs) that translates text written in a computer language (the source language) into another computer language (the target language). The original sequence is usually called the source code and the output called object code. The system 200 can further include a process 125 for just-in-time compilation for virtual machine environments for fast applications start-up and maximal run-time performance, as further discussed herein.

In exemplary embodiments, a client type of workload implements a version of the initially compiled code for most of its functionality, except when a batch procedure is started in the client environment. For example, a software development tool starts compilation of the developed project. In this example, a "hot" code detection mechanism in the VM execution environment is implemented to detect the methods that are involved in the batch processing, initiate recompilation on them and produce better optimized versions of the code.

Figure 2:
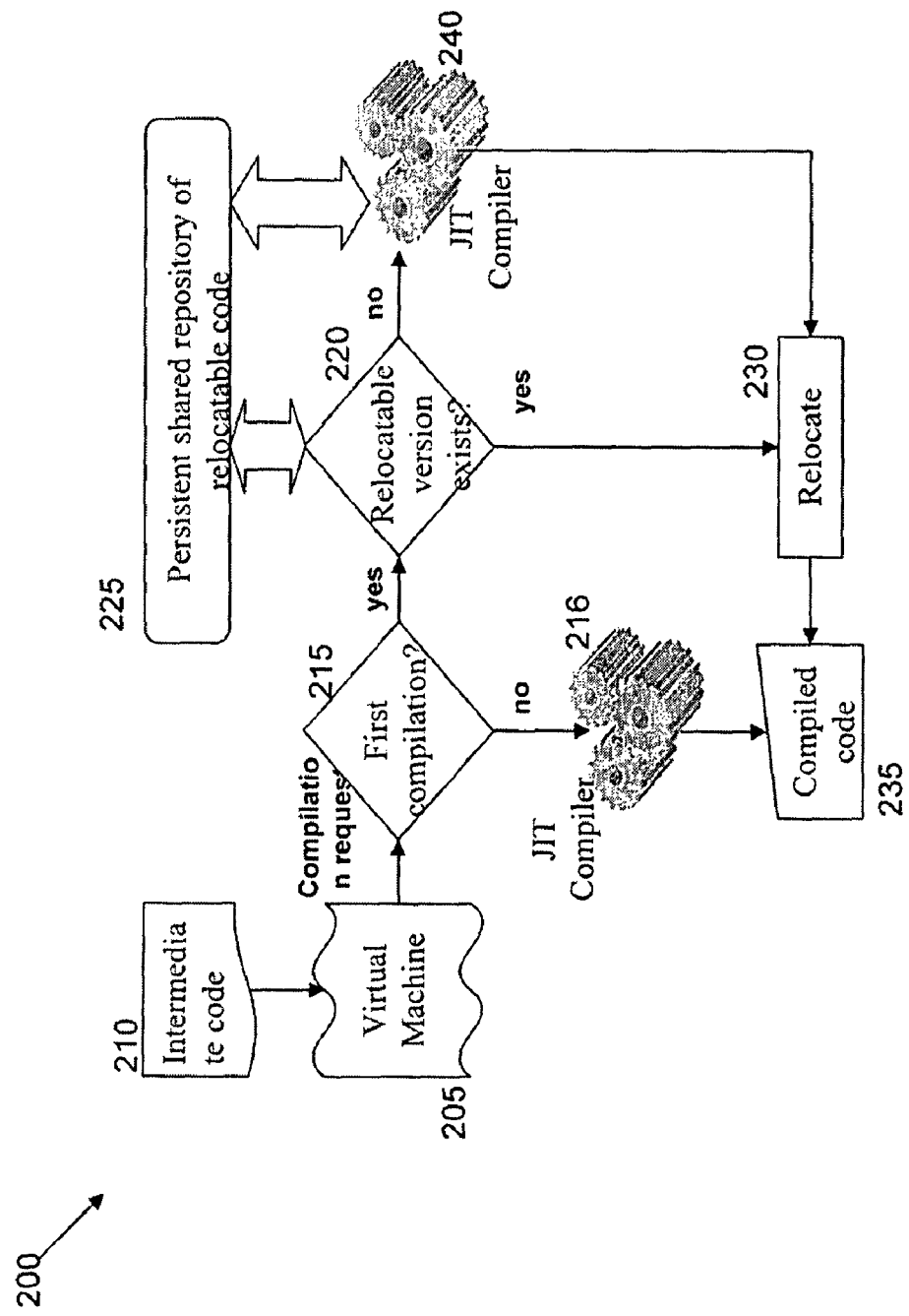
FIG. 2 illustrates a workflow for a compilation algorithm for a client-type of workload in accordance with exemplary embodiments.

FIG. 2 illustrates a workflow 200 for a compilation algorithm for a client-type of workload in accordance with exemplary embodiments. The work flow 200 of the execution in client application mode starts when the VM 205 decides to compile a program structure (e.g., method) such as the intermediate code 210. The workflow 200 then determines whether the compilation is a first compilation at 215. If the compilation is the first compilation attempt at step 215 for the program segment the workflow 200 then queries if there is a relocatable version in the persistent shared code repository 225 at step 220. If there is a relocatable version from previous VM execution it is relocated in a process address space at 230 and the method body is available in binary format at 235. If at 220, a relocatable version of the program structure doesn't exist in the persistent cache, the JIT compiler is invoked at 240 to produce one, which after finished initiates the relocation at 230. If at 215 compiled code segment already exists, then the method is recompiled at 216 based on the required hotness from the VM.

In exemplary embodiments, for a server type of application the "hot" detection mechanism does not work because the application profile is usually "flat" (it has many methods all taking similar time share of the total time) and doesn't contain "hot" code sections. In such a case, the code is gradually recompiled to achieve better run-time performance. Recompiling the code causes extra memory overhead, however, application middleware software usually requires high quantity of heap memory and the size of the generated code is only a very small fraction of the active process memory. Thus, recompiling the methods and generating duplicate versions is not memory critical, given the execution environment of middleware application software. The recompilation process of the server type of code requires a separate compilation thread and queued compilations with a priority and feedback system. The recompilation of the methods does not interfere with the application startup, that is, the higher optimization compilation for a method should be postponed until the application has fully started. In exemplary embodiments, various techniques can be implemented to identify that the application execution is still mainly in startup mode, e.g. certain amount of classes get loaded per second.

In exemplary embodiments, the server application workload recompilation strategy requires a compilation queue system with priorities. Each compilation request of a method is asynchronous and the request adds an entry into the compilation queue with certain priority. The initial compilations (with relocation) have the highest priority and they are processed from the queue without any restrictions. After the initial compilation is performed, either by creating relocatable version of code or by using relocatable code loaded from a persistent cache, a new compilation entry with lower priority is immediately created and put it on the compilation queue. The initial compilation stage also records various properties of the program structure it is compiling and creates a compilation summary field. The summary field is used later to determine the next optimization level for the subsequent compilation request. In exemplary embodiments, the higher the selected optimization level, the lower its priority is on the queue. After the program structure is recompiled based on the queue requests further recompilation is possible through identifying "hot" code portions. Program structures identified as "hot" are treated with higher priority than the "artificially" created recompilation requests, but at the same time with lower priority than the initial compilation level.

The compilation thread processes the compilation requests on the queue in priority order, but it ignores the lower priority requests until the application startup phase has ended and all higher priority requests are satisfied. After the initial startup, the compilation thread starts satisfying the compilation requests for recompilation at a given rate which is self-tuning. The compilation thread monitors the CPU utilization of the system and if the system is not fully utilized it increases the compilation rate, while if the system CPU utilization is maxed out, then the rate slows down to help application do work. Eventually, since there is limited amount of code in the application all code is recompiled over time.

Figure 5:
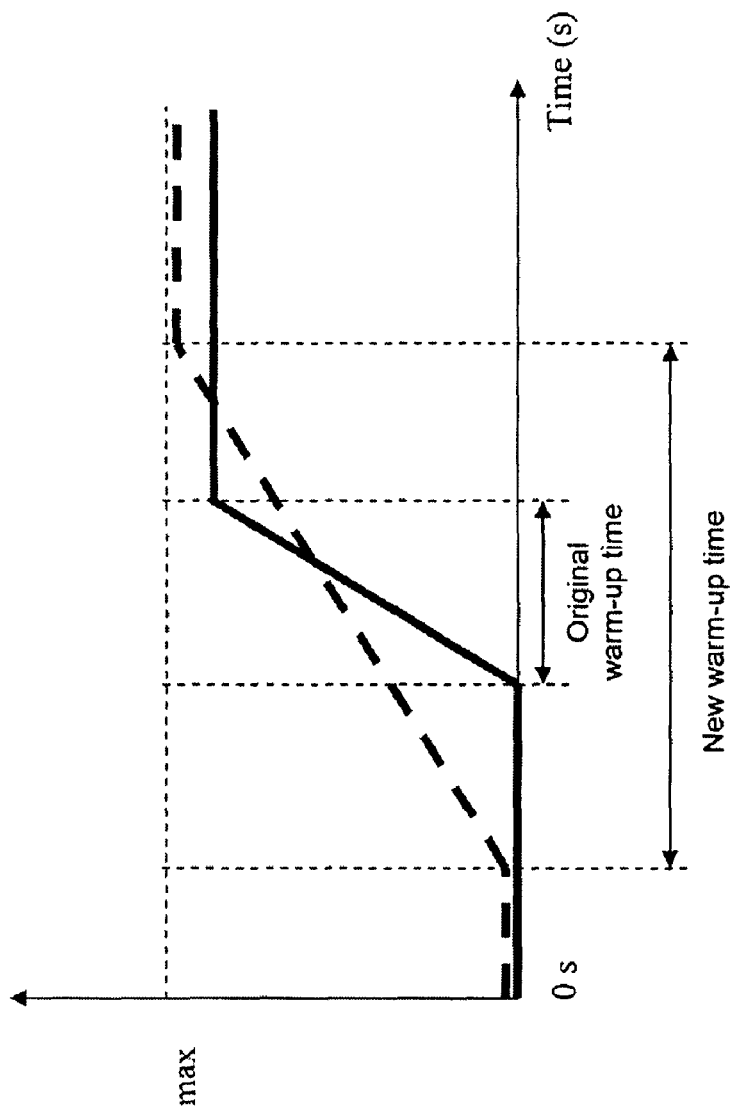
FIG. 5 illustrates a throughput versus time chart in accordance with exemplary embodiments.

By using this recompilation strategy for server based workloads we satisfy two of the most important requirements in application server world, minimal "down-time" and maximal "run-time" performance. FIG. 5 below illustrates a visualization of how the new recompilation scheme differs in startup and run-time performance.

Figure 3:
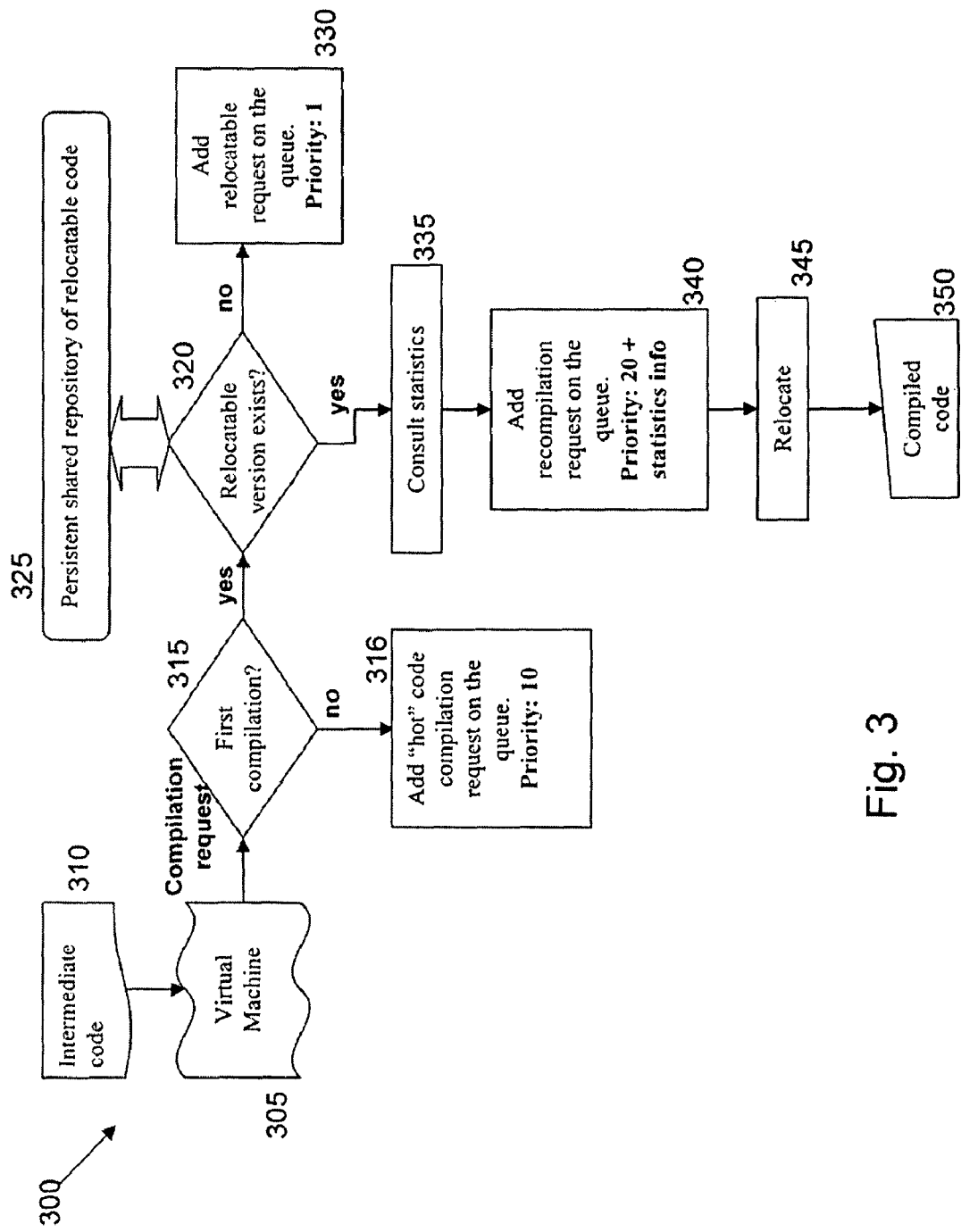
FIG. 3 illustrates a compilation request creation flow for a compilation algorithm for a server-type of workload in accordance with exemplary embodiments.
Figure 4:
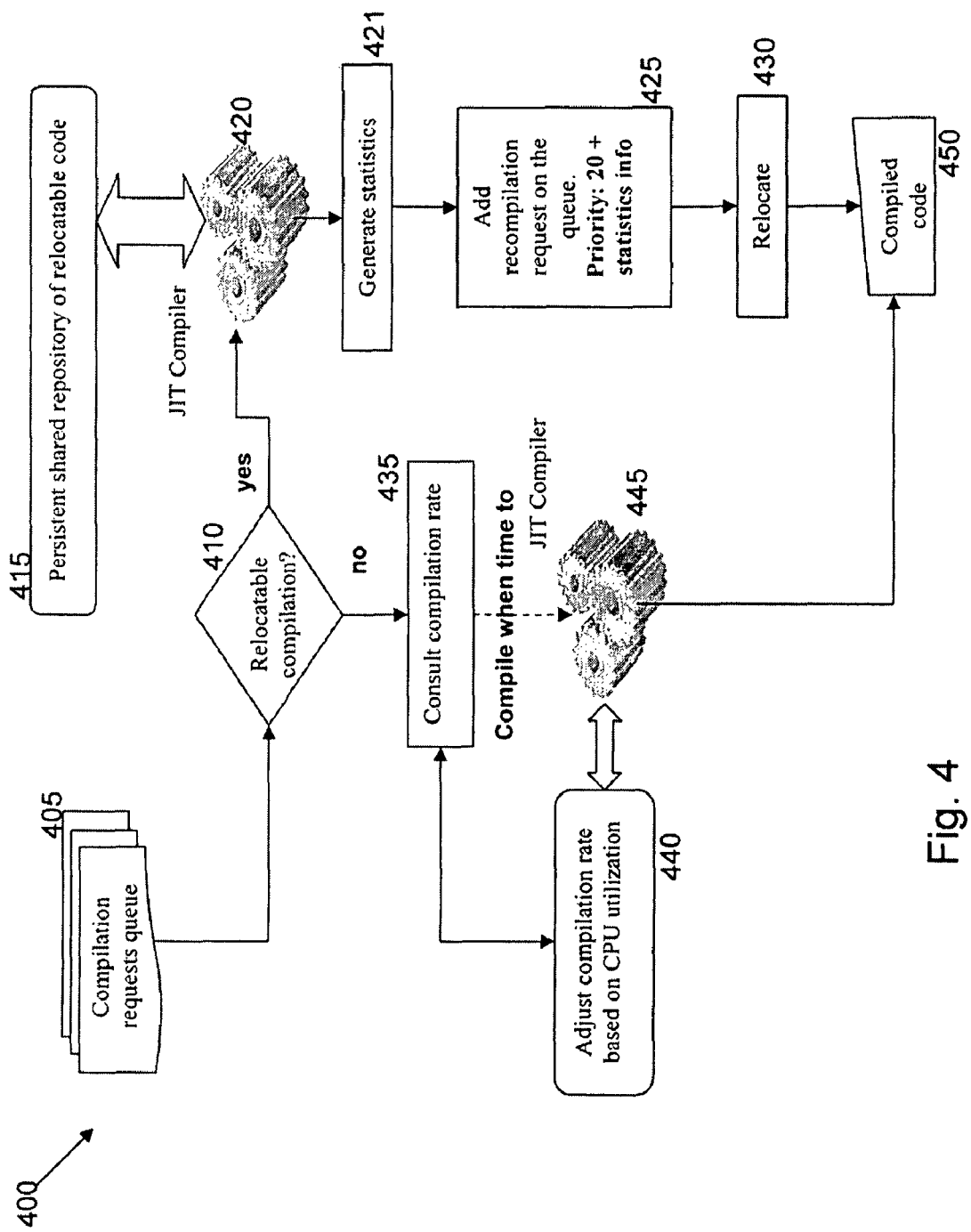
FIG. 4 illustrates a the JIT compiler thread flow 400 for a compilation algorithm for a client-type of workload in accordance with exemplary embodiments.

FIG. 3 illustrates a compilation request creation flow 300 for a compilation algorithm for a server-type of workload in accordance with exemplary embodiments. As further described herein FIG. 3 represents a compilation request flow 300 and FIG. 4 represents a JIT compiler thread flow 400. FIG. 3 describes the mechanism that creates the compilation requests and puts them in the queue with certain priority. The lower the priority value the higher the compilation moves in the queue. The relocatable compilation requests are treated a bit differently than the rest. They are serviced immediately and for each relocatable request a higher duplicate request is created.

In exemplary embodiments, the flow 300 of the execution in the server application mode starts when the VM 305 decides to compile a program structure (e.g., method) such as the intermediate code 310. The flow 300 then determines whether the compilation is a first compilation at 315. If it is not a first compilation at 315, then the hot code compilation request is added on the queue with a priority (e.g., 10) at 316. If the compilation is the first compilation attempt at step 315 for the code, the flow 300 then queries if there is a relocatable version in the persistent shared code repository 325 at step 320. If there isn't any relocatable version from previous VM execution, the relocatable request is added to the queue with a top priority (e.g., 1) at 330. If at 320, a relocatable version of the code exists in the persistent cache, then statistics are consulted at 335. At 340, a recompilation request is added to the queue with a certain priority (e.g. 20 plus statistics information). At 345 the relocation is initiated and the binary code is available at 350.

FIG. 4 illustrates a JIT compiler thread flow 400 for a compilation algorithm for a server-type of workload in accordance with exemplary embodiments. The compilation thread processes the requests on the queue 405 one by one using priority to schedule them in order. If the request is for relocatable compilation at 410 it is immediately processed at the compiler 420 and the resulting relocatable code is placed in the persistent shared repository of relocatable code 415. The statistics are generated at 421. A recompilation request is added to the queue at 425 with a certain priority (e.g., 20 plus the statistics information). At 430 the relocation is initiated and the binary code is available at 450. For the rest at 410, the flow 400 consults the CPU utilization and the current processing rate at 435, 440 to decide how frequently it should process the requests on the queue. It is then processed at 445 and compiled at 450.

Alternatively, the same results can be achieved by using two compilation threads. One that runs at normal priority in the OS and processes the relocatable compilation requests and another that runs at lower priority and processes the rest of the requests. We can also impose the control that the second compilation thread does not process any requests if the program is still in startup mode.

With regards to the compilation queue, the queue can alternatively be implemented using multiple queues for the various priorities. The change can be made for practical reasons, as it is easier to implement the "add" and "remove" from queue operations on uniform lists. This modification doesn't change the design and its implementation details only.

FIG. 5 illustrates a throughput versus time chart in accordance with exemplary embodiments. A new compilation scheme is represented by the dashed line and a comparable conventional scheme is represented by the solid line. Start-up and run-time performance are compared. It is appreciated that with the new approach there is a shorter down time and better throughput. There is an increased warm-up time due to increased compiling over time. Stretching out the warm-up time does not cause any visible problems because it only affects the transaction time by a fraction and gradually improves over time, which preserves the natural workload of the application server.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A just in time compilation method for a virtual machine environment coupled to a memory, comprising:
    identifying a program structure for compilation;
    creating a low optimization compiled version of the program structure that is relocatable in the memory, wherein the low optimization compiled version of the program structure does not have a fixed address and is not directly executable;
    storing into a persistent cache the low optimization compiled version of the program structure that is relocatable;
    relocating the low optimization compiled version of the program structure into a virtual machine address space in the memory, wherein relocating the low optimization compiled version of the program structure includes transforming the low optimization compiled version to a compiled version with fixed addresses in the memory that can be executed;
    responsive to a determination that a relocatable code version of the program structure already exists in the persistent cache, loading the relocatable code version of the program structure from the persistent shared cache; and
    relocating the loaded relocatable code version of the program structure into a current address space, including transforming the low optimization compiled version of the program structure to a compiled version of the program structure with fixed addresses in the memory that can be executed;
    assigning a priority to the program structure, wherein a higher initial compilation optimization level is assigned a lower priority and a lower initial compilation optimization level is assigned a higher priority;
    placing the an entry associated with the prioritized program structure in a queue; and
    retrieving the prioritized program structure from the queue in response to a compilation thread processing the assigned priority,
    wherein the memory includes a plurality of fixed addresses, each fixed address of the plurality of fixed addresses capable of being transformed regardless of where in the memory the low optimization compiled version of the program structure is loaded.

2. The method as claimed in claim 1 further comprising adjusting a compilation rate based on utilization for a central processing unit coupled to the virtual machine environment.

3. A just in time compilation system, comprising:
    a virtual machine environment having a central processing unit and a memory coupled to the central processing unit;
    a just in time compilation process residing in the memory and having instructions for:
    identifying a program structure for compilation;
    creating a low optimization compiled version of the program structure that is relocatable in the memory, wherein the low optimization compiled version of the program structure does not have a fixed address and is not directly executable;
    storing into a persistent cache the low optimization compiled version of the program structure that is relocatable;
    relocating the low optimization compiled version of the program structure into a virtual machine address space in the memory, wherein relocating the low optimization compiled version of the program structure includes transforming the low optimization compiled version to a compiled version with fixed addresses in the memory that can be executed;
    responsive to a determination that a relocatable code version of the program structure already exists in the persistent cache, loading the relocatable code version of the program structure from the persistent shared cache;
    relocating the loaded relocatable code version of the program structure into a current address space wherein, relocating the loaded relocatable code version of the program structure includes transforming the low optimization compiled version of the program structure to a compiled version of the program structure with fixed addresses in the memory that can be executed, wherein the memory includes a plurality of fixed addresses, each fixed address of the plurality of fixed addresses capable of being transformed regardless of where in the memory the low optimization compiled version of the program structure is loaded;

assigning a priority to the program structure, wherein a higher initial compilation optimization level is assigned a lower priority and a lower initial compilation optimization level is assigned a higher priority;

placing the an entry associated with the prioritized program structure in a queue;

retrieving the prioritized program structure from the queue in response to a compilation thread processing the assigned priority; and adjusting a compilation rate based on utilization for a central processing unit coupled to the virtual machine environment.

* * * * *